(12) United States Patent
Kervistin et al.

(10) Patent No.: US 7,520,136 B2
(45) Date of Patent: Apr. 21, 2009

(54) METHOD AND SYSTEM FOR PROTECTING GAS TURBINE FUEL INJECTORS

(75) Inventors: Robert Kervistin, Le Mee sur Seine (FR); Marion De Giacomoni, Thiais (FR); Jose Rodrigues, Nandy (FR); Gilles Rollin, Blandy les Tours (FR)

(73) Assignee: SNECMA, Paris (FR)

( * ) Notice: Subject to any disclaimer, the term of this patent is extended or adjusted under 35 U.S.C. 154(b) by 577 days.

(21) Appl. No.: 11/147,302

(22) Filed: Jun. 8, 2005

(65) Prior Publication Data

US 2009/0071119 A1 Mar. 19, 2009

(30) Foreign Application Priority Data

Jun. 10, 2004 (FR) .................................. 04 06270

(51) Int. Cl.
*F02C 1/00* (2006.01)
*F02G 3/00* (2006.01)
(52) U.S. Cl. ..................... 60/772; 60/39.094
(58) Field of Classification Search ................ 60/772, 60/776, 39.094, 740
See application file for complete search history.

(56) References Cited

U.S. PATENT DOCUMENTS

| 4,242,863 | A | * | 1/1981 | Bailey .................. 60/776 |
| 4,730,453 | A | | 3/1988 | Benoist et al. |
| 5,881,550 | A | | 3/1999 | Toelle |
| 5,927,253 | A | * | 7/1999 | Oyafuso et al. ........ 123/456 |
| 6,125,624 | A | | 10/2000 | Prociw |
| 6,244,034 | B1 | * | 6/2001 | Taylor et al. ........... 60/776 |

FOREIGN PATENT DOCUMENTS

| DE | 39 16 477 A1 | 11/1990 | |
| JP | 60164627 A | * 8/1985 | ........ 60/39.094 |

* cited by examiner

*Primary Examiner*—Michael Cuff
*Assistant Examiner*—Gerald L Sung
(74) *Attorney, Agent, or Firm*—Oblon, Spivak, McClelland, Maier & Neustadt, P.C.

(57) ABSTRACT

The invention relates to a method and a device for protecting fuel injectors in a turboshaft engine. The protection is carried out by injecting compressed air directly into the injectors. The air thus directly purges the injectors and evacuates the fuel present in them into the combustion chamber.

5 Claims, 8 Drawing Sheets

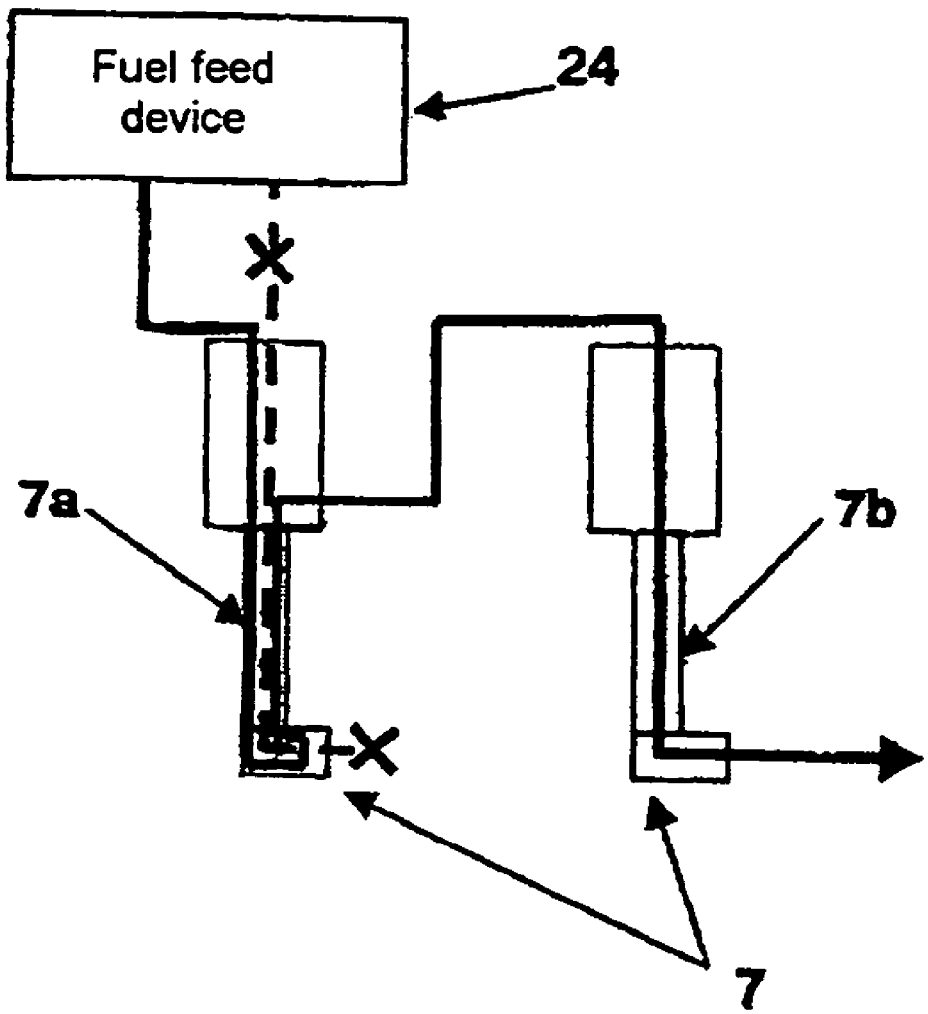
Figure : 1a
Prior art

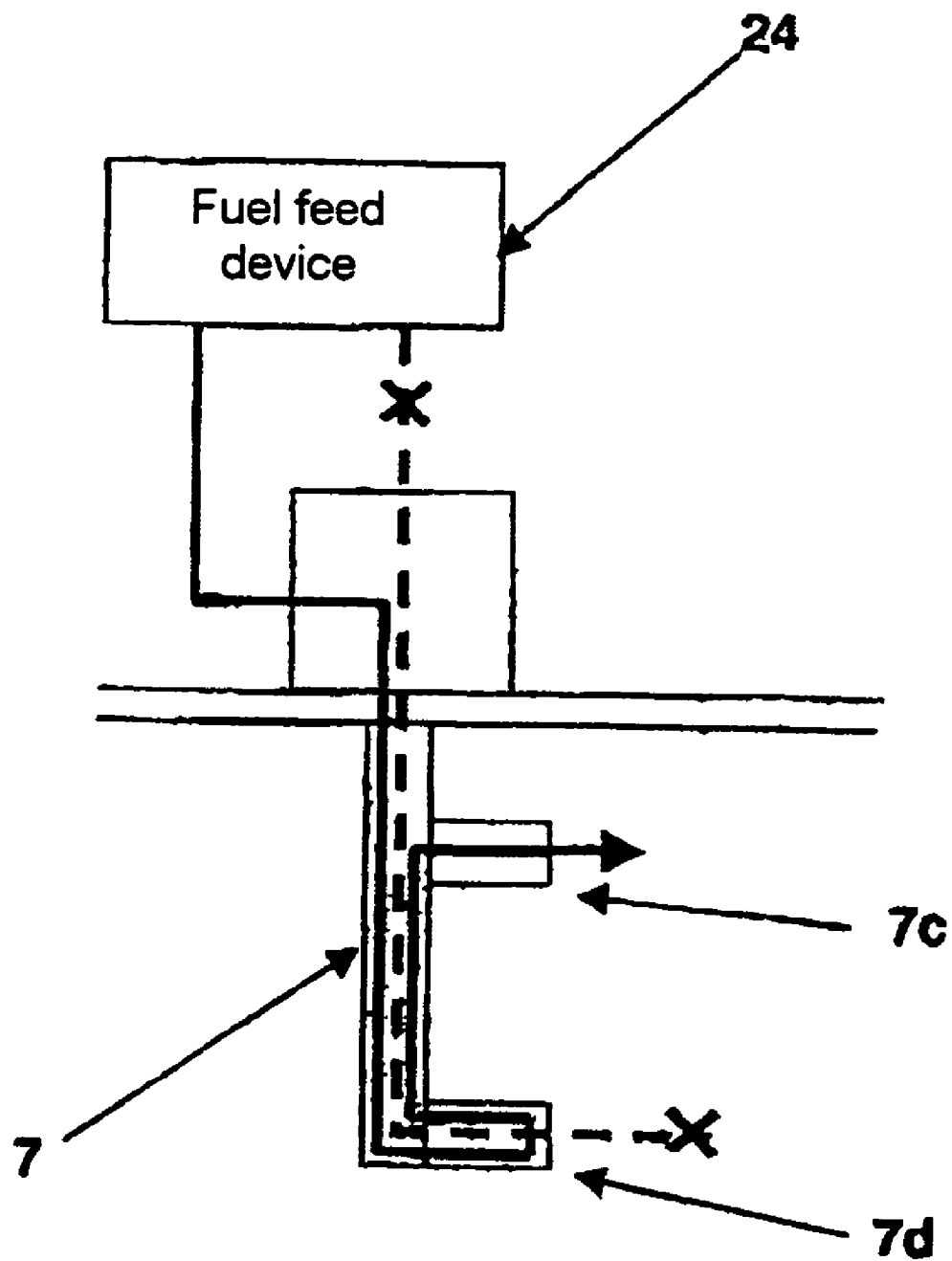
Figure : 1b
Prior art

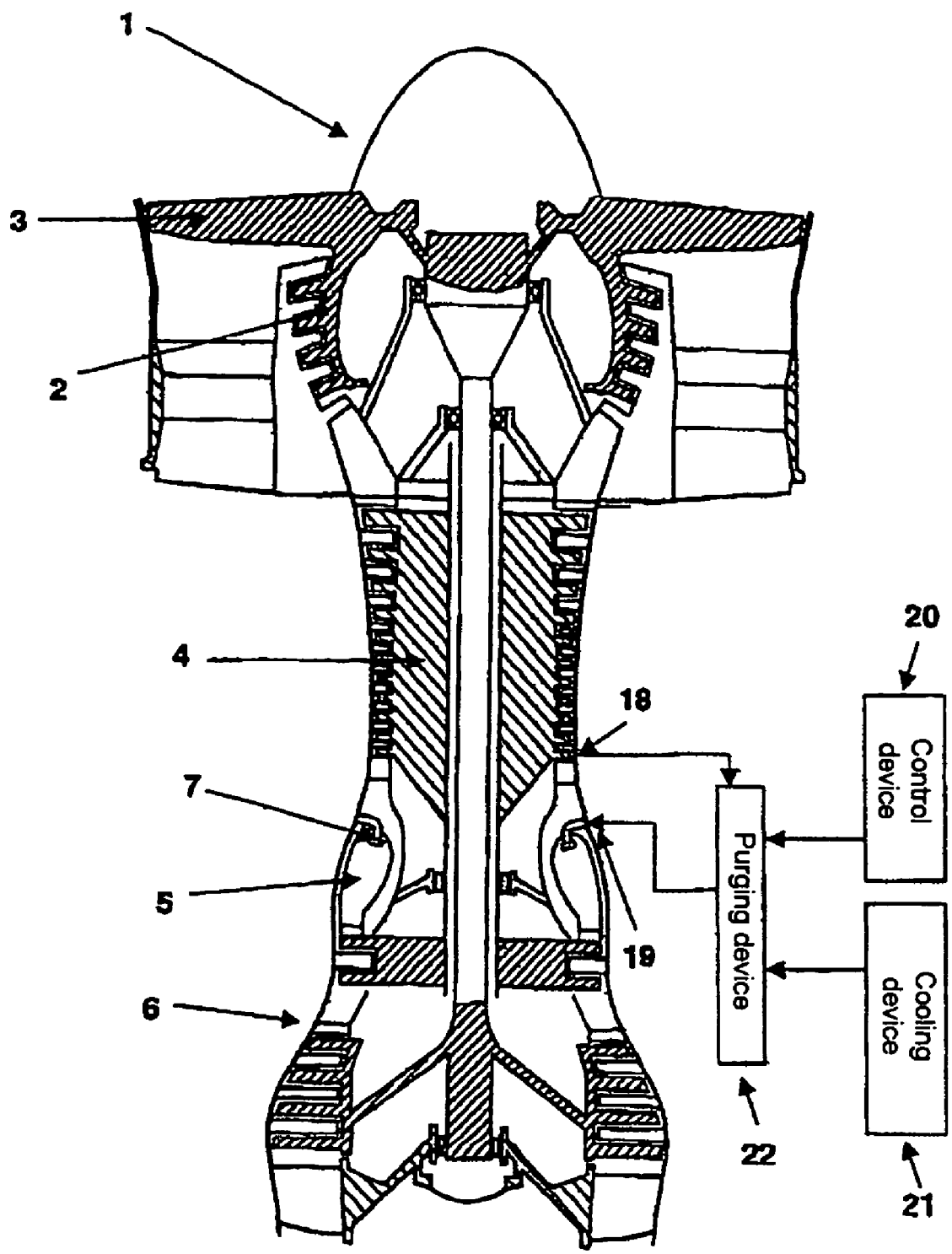
Figure : 2

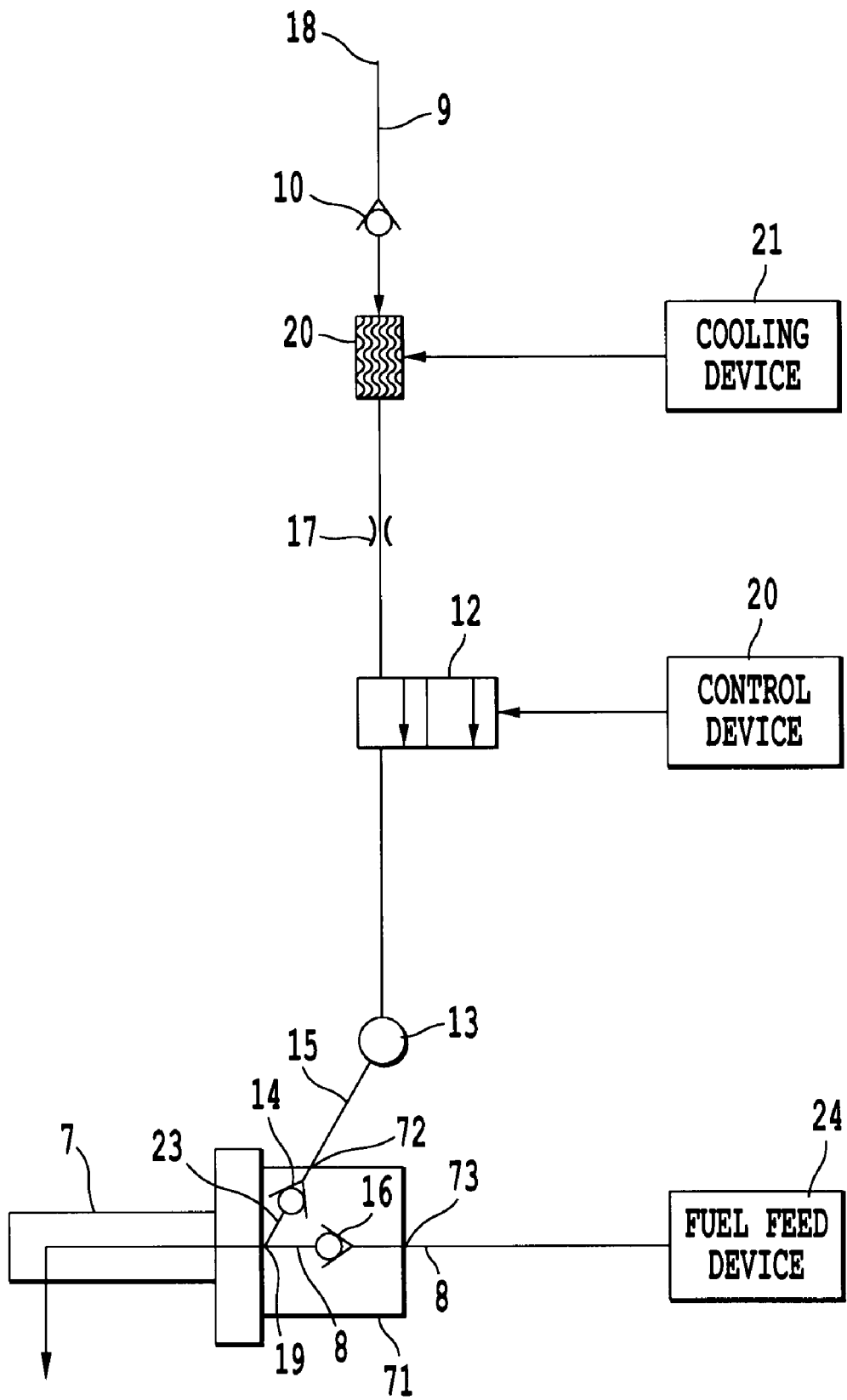
Figure : 3

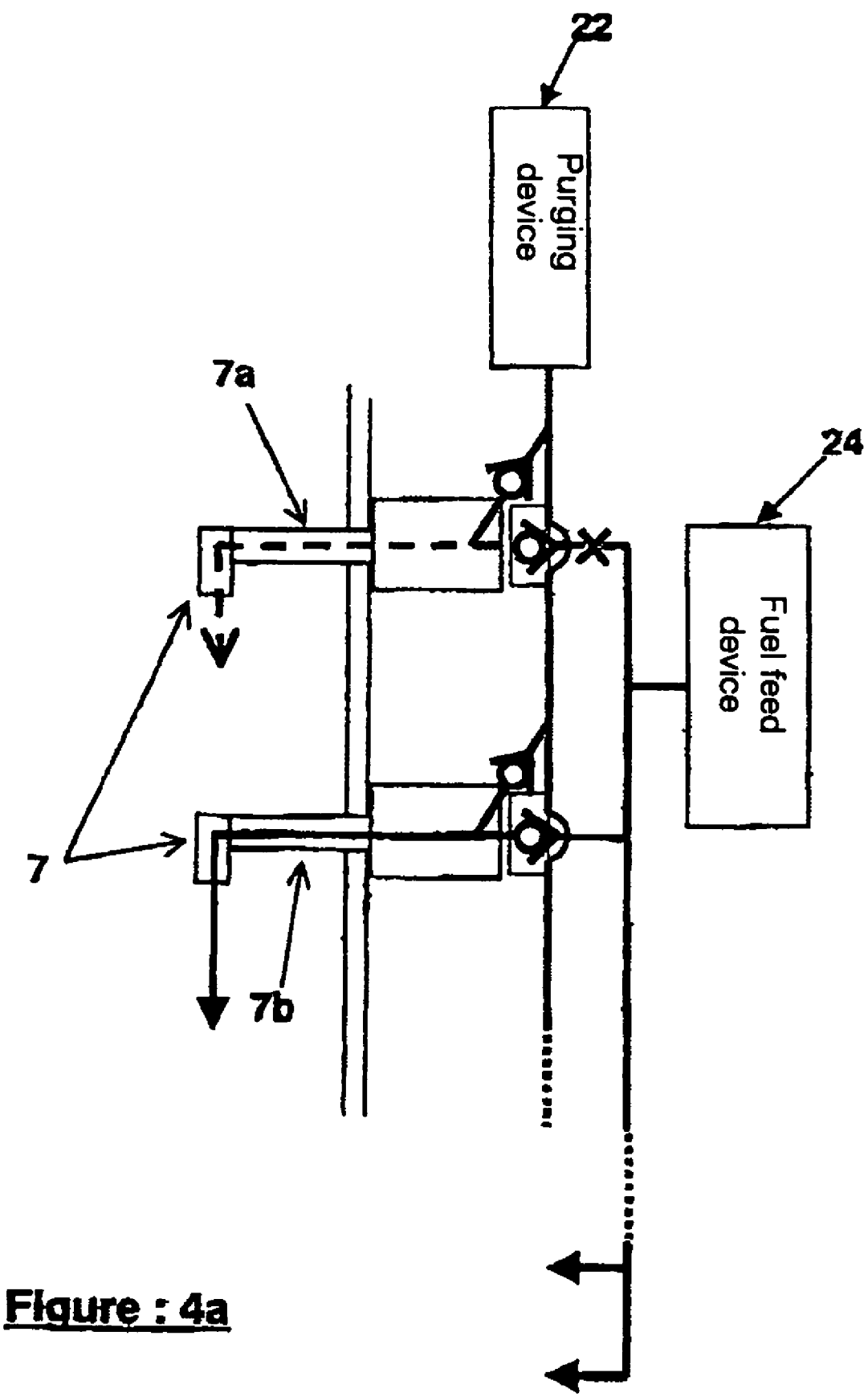
Figure : 4a

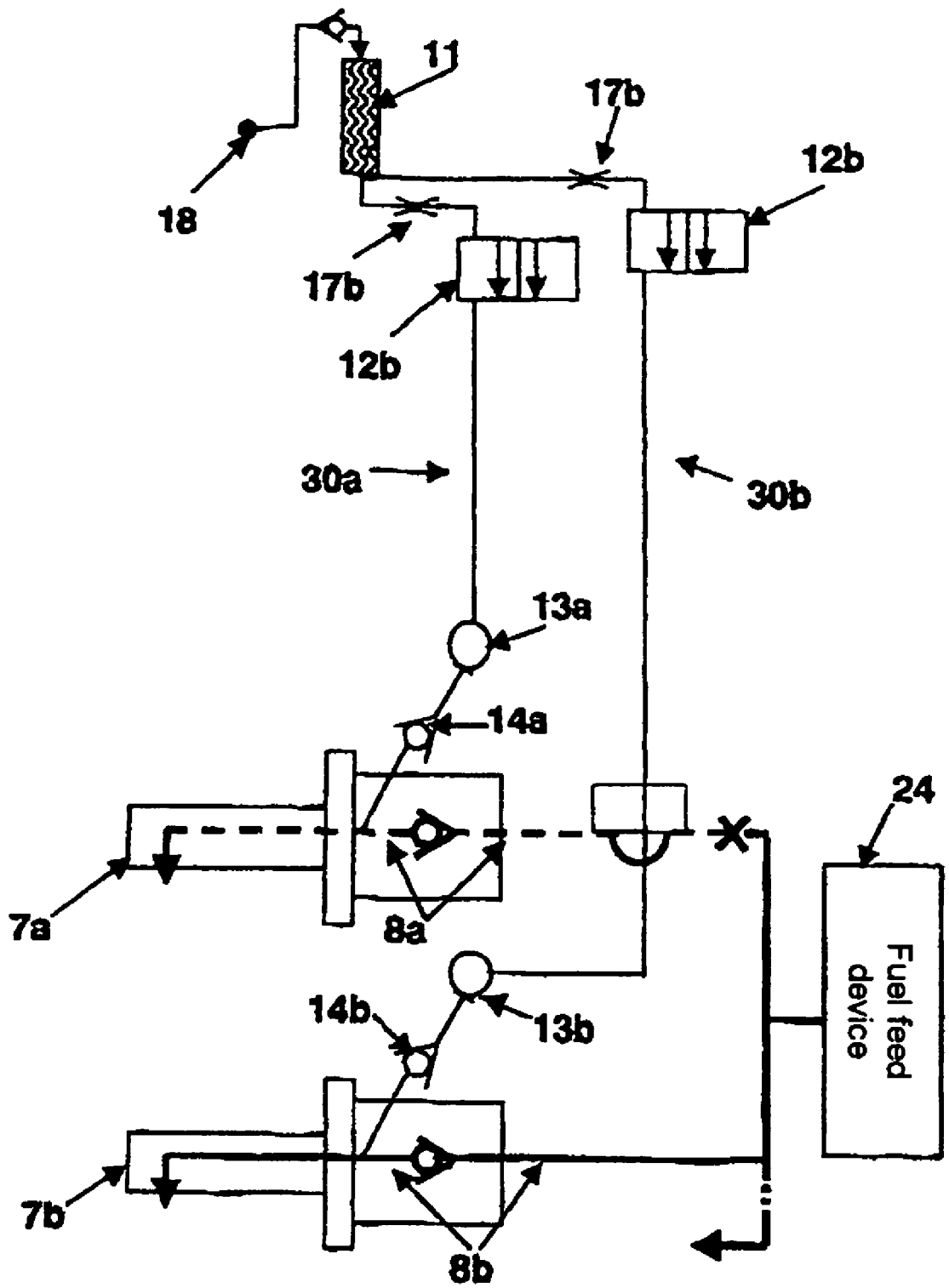
Figure : 4b

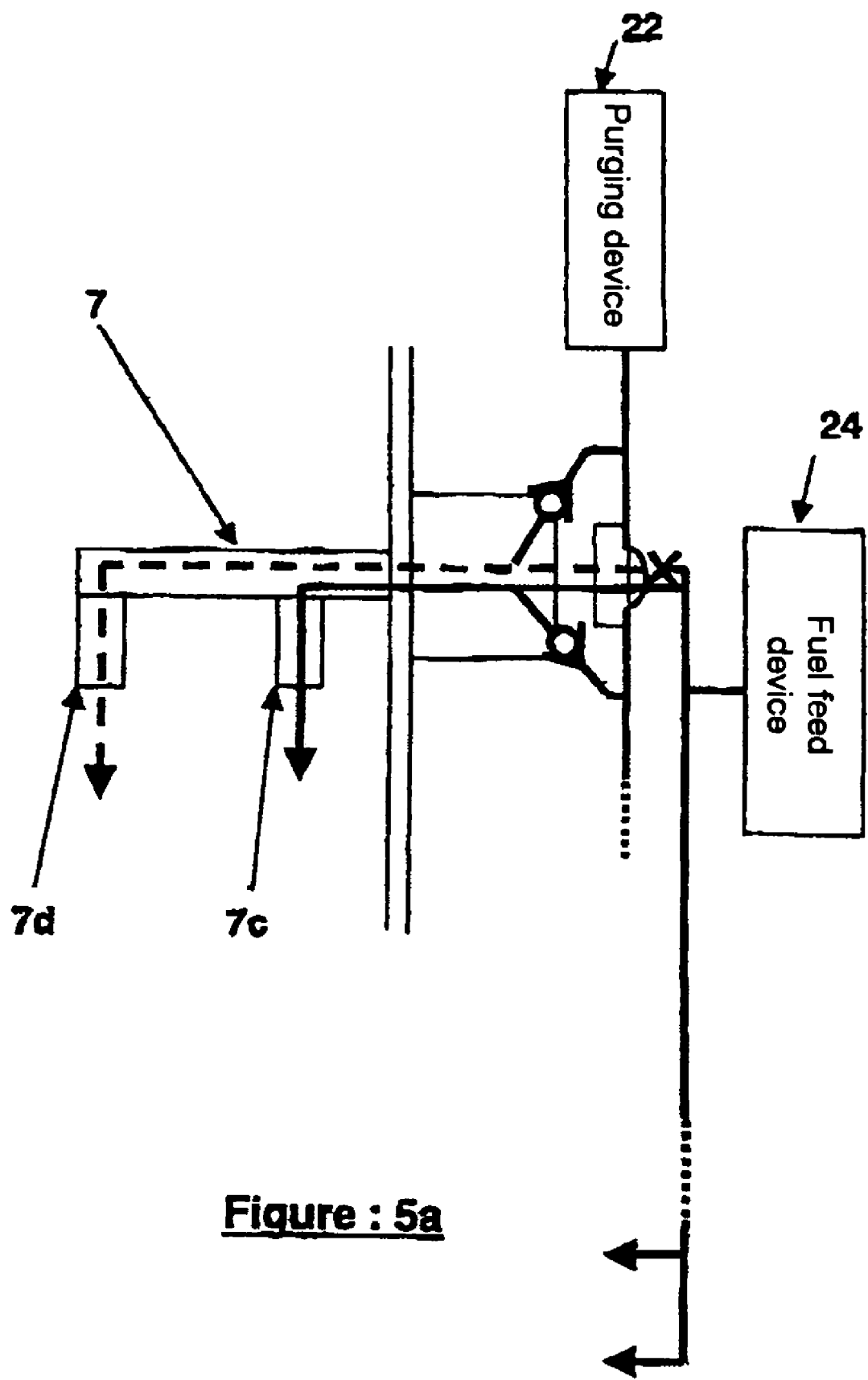
Figure : 5a

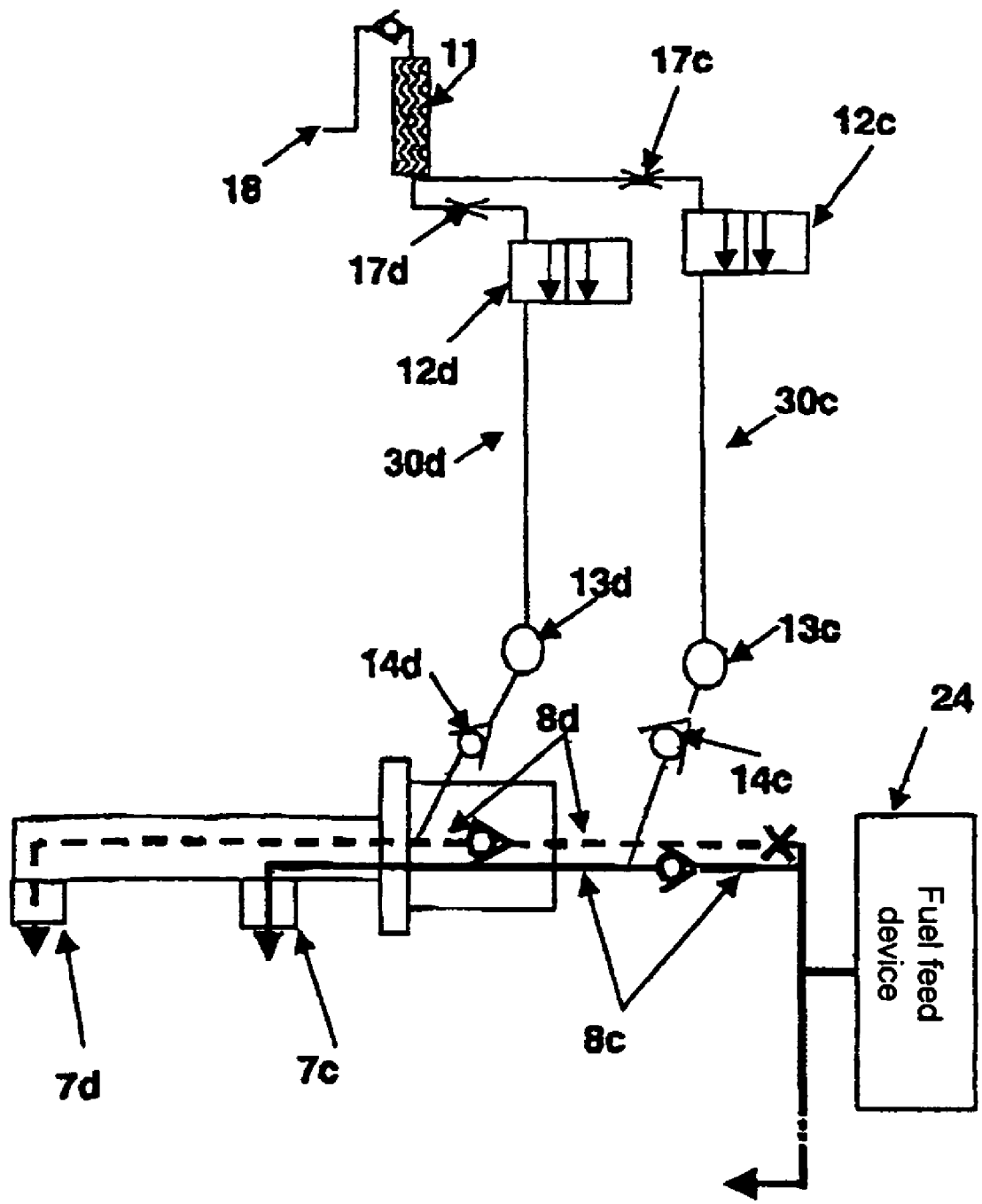
Figure : 5b

METHOD AND SYSTEM FOR PROTECTING GAS TURBINE FUEL INJECTORS

The invention relates to a method and a system for protecting fuel injectors in turboshaft engines, and more particularly in turbojets.

Turbojet fuel injectors are very sensitive to the degradation of the fuel by temperature. This phenomenon, called coking, appears when the temperature of the fuel exceeds a critical threshold of about 204° C. This temperature comes from the flame in the combustion chambers into which the injectors protrude. The injectors are very sensitive to this phenomenon because of the disturbances in the fuel flow, or even obstruction, which it produces.

The flow disturbances due to coking have mechanical repercussions on the parts located downstream of the injectors, but also repercussions on the quality of the combustion. Coking gives rise to flow rate differences between injectors and consequently temperature differences between flames in the combustion chamber which are harmful to the combustion chamber and the turbine since they cause hot spots and therefore damage. This damage results, on the one hand, in a reduction of the service life of the combustion chamber and of the turbine and, on the other hand, a shortening of the mean time between two removals of the injectors since it is then necessary to clean them more often. Moreover, the obturation of the injectors has an effect on the quality of the spraying of the fuel, which is no longer uniform. The combustion is therefore poor, which results in an increase in pollution by the gases emitted by the turbojet.

In the most serious cases, coking can lead to the impossibility of starting the engine on the ground, the impossibility of restarting the engine in flight and the thermal perforation of the combustion chamber or even the destruction of the turbine blades.

When there is fuel injection, the risk of coking is very low because it is the fuel itself which evacuates the calories and the injectors are designed and dimensioned in such a way that the temperature of the fuel never reaches the temperature limit of 204° C.

During the functioning of a turbojet, the critical phases with respect to coking are different depending on the type of injector used.

In the case of a single-head combustion chamber, that is to say one having a single circumferential row of injectors, all of the injections function at the same time, whatever the operating point of the turboshaft engine in question may be. In this case, the critical phase is the stopping of the engine. In fact, the radiation and the temperature of the turbojet remain very high over a long period after the stopping of the engine, and therefore whilst the injectors are no longer supplying fuel and are no longer evacuating the calories.

In the case of so-called "double-head" combustion chambers, that is to say those with two circumferential rows of fuel injectors, or in the case of combustion chambers comprising a single circumferential row of so-called "double-head" injectors, that is to say provided with two fuel injection heads, the critical phases are the stopping of the engine, and also the case of operating with only one section of the injectors, and of the injection heads respectively, that are operational and which are supplying fuel, the other injectors, and injection heads respectively, being in the rest state. For example, whereas on takeoff all of the injection heads are supplied with fuel in order to provide maximum power, when cruising the power requirement, and therefore the provision of fuel, is less and requires the functioning of only a section of the injectors or of the injection heads.

Moreover, in order to improve the quality of the injection and by this the quality of the combustion, the tendency is towards the reduction of the size of the fuel drops injected and towards the use of injectors of the multipoint type. Multipoint injectors are provided with several fuel outlet orifices, the diameters of these orifices being able to be different in a same injector. Increasing the number of injection points makes it possible to homogenize the spraying in the whole of the space formed by the combustion chamber. The quantity of fuel injected is identical to the quantity injected in the case of use of injectors provided with a single outlet orifice, which implies that the outlet orifices of multipoint injectors have smaller diameters. This reduction of the diameter of the orifices, and therefore of the fuel feed ducts within the injector, makes this type of injector even more susceptible to coking. Multipoint injectors can be used in single or double head chambers.

At the present time, two methods make it possible to protect the injectors from coking: purging, when the engine is stopped, and cooling, in the case of combustion chambers with two circumferential rows of injection heads only.

Purging is a well-known and widely used method of protecting fuel injectors, in particular on turbojets. As described in the patent DE3916477, up to the present time, the fuel injection manifold assembly is purged at the same time as the injectors by the injection of compressed air, the air being stored, cooled and possibly recompressed. In this patent, the non-return valve, preventing any rising of purging air in the fuel supply circuit, is installed upstream of the fuel feed manifold. During purging, this makes it necessary to empty the fuel injection manifold and the injectors, thus releasing into the combustion chamber a large quantity of fuel, which risks becoming ignited. Furthermore, in order to ensure a restarting of the engine, it is then necessary to again fill these fuel injection manifolds, a long period of time being required to achieve this. For this reason, this method can be applied neither to "double-head" injectors nor in the case of "double head" combustion chambers, when just one section of the injectors is functioning. In fact, it necessitates the purging of a large part of the fuel injection circuit, which is not compatible with switching times, that is to say with the times required for changing from one case of functioning to another, these times having to be very short.

The method of protecting fuel injectors by cooling is used in particular in the case of double-head combustion chambers as shown in FIG. 1a. This method consists in causing the fuel to circulate inside the injectors in the rest state 7a before sending it into the operational injectors 7b through which it will be ejected into the combustion chamber. This method is also applied with so-called "double-head" injectors, as shown in FIG. 1b. In this case, the fuel circulates in the head 7d which is not dispensing in order to cool it before being injected into the chamber through the second injector head 7c. A first disadvantage of this system of preventing coking is related to the complexity of the cooling circuit to be installed. A second disadvantage is related to the fact that the cooling has effect only whilst the engine is functioning. In fact, as soon as the engine is stopped, the circulation of fuel used for cooling the injectors is stopped, and all of the injectors are then subjected to the radiation of the engine, and therefore to the risk of coking.

The purpose of the invention is to overcome the disadvantages of the existing protection systems by defining a method and a system for protecting fuel injectors, able to replace the existing systems for protecting by purging and by cooling and able to be applied to all types of injectors and for all combustion chambers, whether they be single or double head.

For this purpose, according to the invention, the method for protecting fuel injectors of a turboshaft engine consists, during functioning phases where the fuel feed of at least one injection head is stopped, in injecting compressed air into a circuit for feeding the injectors with fuel, the air being injected directly and solely into each fuel injection head that is not being fed, downstream of a non-return valve dedicated to each injection head and disposed on each fuel duct inside the injectors.

Advantageously, the injection of compressed air into the injection heads that are not being fed with fuel is controlled by control means, on the basis of an input signal representing the operating conditions of the turboshaft engine.

Preferably, the compressed air is taken from the output of a compressor of the turboshaft engine, and then stored in a tank. The stored compressed air is then injected directly into each fuel injection head that is not being fed by the intermediary of a fuel duct inside the corresponding injector that is not being fed.

The invention also relates to a system for protecting fuel injectors of a turboshaft engine comprising fuel injectors having at least one fuel injection head, one duct for taking compressed air connected to an input of an air tank via a first non-return valve, the air tank comprising a cooling system and an output connected to an air injection duct via an air injection manifold and a second non-return valve installed in such a way as to open in the direction of the air injection, the air injection duct being intended to be directly and solely connected to at least one fuel injection head that is not being fed and a non-return valve being placed in each fuel duct inside the injectors.

Advantageously, the non-return valves disposed in each internal fuel duct are positioned inside each fuel injector.

The system furthermore comprises a valve for the outlet of the compressed air from the tank to the air injection manifold controlled by a computer, the outlet valve allowing pressurized air to pass solely into the injection heads that are not being fed with fuel.

Advantageously, the device comprises means of regulating the purging air flow rate such as, for example, a diaphragm.

Alternatively, the means of regulating the purging air flow rate comprise a servo-valve controlled by the computer and disposed downstream of the tank.

Advantageously, the duct for taking compressed air is designed to be connected to the output of a compressor of the turboshaft engine.

The present invention furthermore relates to a turboshaft engine comprising at least one compressor and at least one fuel injector, the injector comprising at least one fuel injection head equipped with a fuel supply duct, comprising a system for protecting the injector connected between an output of the compressor and a fuel feed duct.

Other features or advantages of the invention will appear clearly in the continuation of the description given by way of non-limiting example and with reference to the appended figures, which show:

in FIG. 1a, an illustration of the principle of cooling fuel injectors in the case of a "double-head" chamber by circulation of fuel in the injectors in the rest state, according to the prior art, in FIG. 1b, an illustration of the principle of cooling fuel injectors by circulation of fuel in the injectors in the case of so-called "double-head" injectors, according to the prior art, in FIG. 2, a schematic view in cross-section of a turbojet equipped with a system for protecting fuel injectors according to the invention, in FIG. 3, a detailed schematic view of a system for protecting fuel injectors according to the invention, in FIG. 4a, an application of the invention in the case of a "double-head" chamber functioning with only one section of the injectors dispensing fuel, for which the purging of the injectors that are not being fed is carried out only when the turboshaft engine is stopped, in FIG. 4b, an application of the invention in the case of a "double-head" chamber functioning with only one section of the injectors dispensing fuel, for which the purging of the injectors that are not being fed is carried out when the turboshaft engine is stopped and during its functioning, in FIG. 5a, an application of the invention in the case of so-called "double-head" injectors, of which only one head out of the two heads that each injector comprises dispenses fuel, and of which the purging of the injector heads that are not fed is carried out only when the turboshaft engine is stopped, in FIG. 5b, an application of the invention in the case of so-called "double-head" injectors, of which only one head out of the two heads which each injector comprises dispenses fuel, and of which the purging of the injectors that are not fed is carried out when the turboshaft engine is stopped and during its functioning.

FIG. 2 shows a schematic view in cross-section of an example of a turbojet 1, equipped with an example of a device 22 for protecting fuel injectors. The turbojet essentially comprises a low pressure compressor 2, provided with a fan 3, a high pressure compressor 4, a combustion chamber 5 and a turbine 6. The fuel is brought to the fuel injectors 7 by the intermediary of fuel feed ducts 8 connected to a fuel feed device 24 by a fuel feed manifold (not shown). The fuel is then ejected into the chamber 5.

The device for protecting fuel injectors, also called the purging device, shown in FIGS. 2 and 3, essentially comprises an air intake duct 9, a first non-return valve 10, a highly compressed air tank 11 able to be equipped with cooling fins, a purging control valve 12, an air injection manifold 13, a second non-return valve 14 and an air injection duct 15.

The injector 7 comprises an internal fuel duct 8 to which is connected a non-return valve 16. This non-return valve 16 can be inside the injector or outside of the injector, but always downstream of the fuel feed manifold.

In the example shown, the purging device is connected between an output 18 of the compressor 4 of the turbojet and a fuel injector 7. The fuel injector 7 has a housing 71 that houses an air feed duct 23 and a fuel feed duct 8 that intersects each other at 19 inside the housing 71. The housing 71 defines an air input 72 in communication with the duct 23, and a fuel input 73 in communication with the portion of the duct 8 inside the housing 71.

During the functioning of the turbojet, compressed air is taken from the output of the high pressure compressor 4, via the intake duct 9 and is stored in the tank 11. The tank 11 is equipped with a non-return valve 10 preventing it from discharging into the compressor 4. As the air can be at high temperature at the output of the compressor 4, the tank is advantageously equipped with cooling means 21 such as, for example, an air-to-air heat exchanger whose cold source comes, for example, from the airflow delivered by the fan 3. This heat exchange can be carried out for example by installing cooling fins on the tank 11. In normal operation, the fuel, injected into the duct 8 and the injector 7, itself evacuates the calories created by the combustion. Its injection pressure, that is to say the pressure existing in the duct 8 and upstream of the non-return valve 16, being greater than the pressure existing upstream of the valve 14, the non-return valve 14 prevents any rising of fuel into the air injection device 13. This valve 14 can be situated in the injector 7, as illustrated in FIG. 2, on the air injection manifold 13, as illustrated in the following figures which will be described below.

When the fuel feed is interrupted, in particular when the turbojet is stopped, the pressure in the injector 7 and in the fuel feed duct 8 reduces. The same applies to the pressure in the high pressure compressor 4, in the chamber 5 and in the turbine 6. The purging control valve 12, controlled by control means 20 such as, for example, a computer, opens and the pressurized air leaves the tank 11. The input signal of these control means can be, for example, the pressure level reached at the output of the compressor, or the rotational speed of the turbojet. The pressure upstream of the valve 14 becomes higher than the pressure downstream. The valve 14 therefore opens and releases the compressed air in the air injection duct 15, connected to the injector by the duct 23. The compresses air thus released will purge the injector 7 by evacuating the fuel that is there into the chamber 5. As the pressure in the duct 15 and upstream of the valve 14 is higher than the pressure upstream of the valve 16, the non-return valve 16 prevents any rising of air into the fuel feed manifold. The valve 16 can be located in the injector 7 or on the fuel feed manifold. A throttling, realized here by a diaphragm 17, makes it possible to limit the purging speed. The diaphragm 17 can be replaced by a servo-valve, controlled by the computer 20. It makes it possible to set the value of the purging airflow rate in order to limit the flow of fuel injected into the chamber 5. This makes it possible to prevent the appearance of hot spots resulting from the ignition of the purged fuel in the vicinity of the turbine 6. Because of this it ensures the viability of the purging system over a wide operating range whilst preserving the mechanical integrity of the combustion chamber 5 and of its modules located downstream. The flow rate value setting is carried out as a function of the pressure available in the tank and of the pressure existing in the combustion chamber 5.

The purging device can be connected to one fuel injector as described with reference to FIG. 2, but it can also be connected to several injectors or injection heads. In this case, the air injection manifold 13 is connected to each of the fuel injectors or injection heads by the intermediary of non-return valves 14 and of air injection ducts 15. The purpose of this manifold is to distribute the air in a homogeneous and simultaneous manner to all of the injectors or injector heads when they are no longer fed with fuel. There is therefore one non-return valve 16 per injector or injection head.

FIGS. 4a and 4b show the application of the invention in the case of a "double-head" combustion chamber in which the injectors are not all fed with fuel at the same time, that is to say in the case where the injectors do not all function at the same time. Two injectors 7a and 7b are shown in these figures. The injector 7a is not being fed and is not therefore dispensing fuel. The injector 7b is being fed and is injecting fuel into the combustion chamber.

FIGS. 5a and 5b show the application of the invention in the case of so-called "double-head" injectors 7 for which only one of the two heads is fed with fuel. These figures show one injector 7 provided with two internal fuel feed ducts, each of the ducts ending at a first head and at a second fuel injection head 7c and 7d respectively. The head 7c is being fed and injects fuel into the combustion chamber. The head 7d is not being fed and therefore does not dispense fuel.

Two cases arise.

FIGS. 4a and 5a illustrate the case where it is desired to purge the injectors, or injector heads respectively, that are not being fed solely when the turboshaft engine is stopped. In this case, the set of injectors 7a and 7b or injection heads 7c and 7d respectively, is connected to a single purging device, whose functioning is identical to that described previously with reference to FIG. 3.

FIGS. 4b and 5b illustrate the case where it is wished to purge the injectors, or injection heads respectively, that are not being fed when the turboshaft engine is stopped and during its operation. In this case, two purging circuits 30a and 30b, 30c and 30d respectively, are installed.

For purposes of clarity, the rest of the description uses a numbering system with an index. The index "i" can assume the values a, b, c or d according to the purging circuit in question.

At the output of the pressurized air tank 11 common to both circuits in the figures, each purging circuit comprises, a throttling device 17i, a purging control valve 12i and an air injection manifold 13i. Alternatively, each purging circuit can comprise its own tank. The first of the two circuits 30a, or respectively 30d, is connected to all of the injectors 7a, or to all of the injection heads 7d respectively, that is to say to all of the injectors, or injection heads respectively, which will have to be purged at the same time during the functioning and stoppage of the turboshaft engine. The second circuit, numbered 30b, or 30c respectively, is connected to all of the injectors 7b, or all of the injection heads 7c respectively, that is to say to all of the injectors which will be purged only when the turboshaft engine is stopped.

During the operating phases necessitating the maximum energy, the injectors 7a and 7b, or the injection heads 7c and 7d respectively, together dispense fuel into the combustion chamber 5. During the operational phases necessitating reduced energy, only the injectors 7b, or injection heads 7c respectively, dispense fuel whilst the injectors 7a, or the injection heads 7d respectively, are no longer fed with fuel. The pressure in the injector 7a, or in the injection heads 7d respectively, and in the fuel feed duct 8a, or 8d respectively, reduces. The same applies to the pressure in the high pressure compressor 4, in the chamber 5 and in the turbine 6.

The purging control valve 12a, or 12d respectively, controlled by the control means 20, opens and the pressurized air comes out of the tank 11. The purging of the injectors and of the injection heads then takes place according to the description given previously, with reference to FIG. 3. Finally, when the turboshaft engine is stopped, the two purging control valves 12a and 12b, or 12c and 12d respectively, open and the pressurized air will purge all of the injectors and all of the injection heads.

The invention is not limited to the examples of embodiment described in detail. In particular, it also applies in the case of a single body turboshaft engine comprising a single compressor and a single turbine. In this case, the air is preferably taken from the output of the compressor. The air could also be taken directly from the output of an external tank.

The invention claimed is:

1. A method for protecting a fuel injector of a turboshaft engine, the fuel injector comprising at least one fuel injection head that includes a head housing that houses a fuel feed duct and an air feed duct that intersect each other inside said head housing, and wherein said head housing defines a fuel input in communication with said fuel feed duct and an air input in communication with said air feed duct, said method comprising the steps of:
   A) injecting fuel in said fuel feed duct of said at least one fuel injection head via said fuel input of said head housing, wherein said fuel is injected from a fuel feed manifold and through a non-return valve provided downstream of said fuel feed manifold;

B) interrupting said injecting of said fuel in said at least one fuel injection head; and C) when said fuel feed duct of said at least one fuel injection head is not being fed with fuel, injecting compressed air into said air feed duct of said at least one fuel injection head via said air input of said head housing such that said compressed air enters said fuel feed duct at a location inside said head housing and downstream of said non-return valve thereby preventing any rising of said compressed air into said fuel feed manifold during said step of injecting said compressed air repeating said steps A, B, and C during operational phases of the turboshaft engine.

2. The method for protecting fuel injectors as claimed in claim 1, further comprising detecting a signal representing the interrupting of said injecting of said fuel in said at least one fuel injection head, and controlling said injecting of said compressed air based on said signal.

3. The method for protecting fuel injectors as claimed in claim 1, further comprising taking the compressed air from an output of a compressor of the turboshaft engine, and then storing said compressed air in a tank.

4. The method of claim 1, wherein the fuel injector comprises a first and a second fuel injection heads, wherein, said step of injecting fuel is performed in said first fuel injection head while said second fuel injection head is being fed with compressed air and not with fuel, and wherein said step of injecting fuel is performed in said second fuel injection head while said first fuel injection head is being fed with compressed air and not with fuel.

5. The method of claim 1, wherein said step of injecting said compressed air is performed without having previously emptied said fuel feed manifold such that fuel remains in said fuel feed manifold during said step of injecting said compressed air.

* * * * *